(12) United States Patent
Judd

(10) Patent No.: US 10,019,452 B2
(45) Date of Patent: Jul. 10, 2018

(54) TOPOLOGY AWARE DISTRIBUTED STORAGE SYSTEM

(71) Applicant: MORGAN STANLEY, New York, NY (US)

(72) Inventor: Glenn M. Judd, Alpine, UT (US)

(73) Assignee: MORGAN STANLEY, New York, NY (US)

( * ) Notice: Subject to any disclaimer, the term of this patent is extended or adjusted under 35 U.S.C. 154(b) by 240 days.

(21) Appl. No.: 15/159,480

(22) Filed: May 19, 2016

(65) Prior Publication Data

US 2016/0342588 A1  Nov. 24, 2016

Related U.S. Application Data

(60) Provisional application No. 62/163,529, filed on May 19, 2015.

(51) Int. Cl.
*G06F 17/30* (2006.01)

(52) U.S. Cl.
CPC .............. *G06F 17/30097* (2013.01)

(58) Field of Classification Search
CPC ................................. G06F 17/30097
See application file for complete search history.

(56) References Cited

U.S. PATENT DOCUMENTS

| 8,301,654 | B2 | 10/2012 | Kodama et al. |
| 8,874,505 | B2 | 10/2014 | Lin et al. |
| 8,977,660 | B1 | 3/2015 | Xin et al. |
| 9,286,344 | B1* | 3/2016 | Bhardwaj ............. G06F 3/0619 |
| 2006/0107043 | A1* | 5/2006 | Kim ..................... H04L 9/0891 |
| | | | 713/163 |
| 2006/0282547 | A1 | 12/2006 | Hasha et al. |
| 2007/0002774 | A1 | 1/2007 | Hasha et al. |
| 2007/0237072 | A1 | 10/2007 | Scholl |
| 2008/0123664 | A1 | 5/2008 | Schwan et al. |
| 2008/0276091 | A1* | 11/2008 | Welin .................... H04L 67/104 |
| | | | 713/170 |
| 2010/0228798 | A1 | 9/2010 | Kodama et al. |

(Continued)

OTHER PUBLICATIONS

Decandia et al., "Dynamo: Amazon's Highly Available Key-value Store," SOSP '07 (Oct. 14-17, 2007).

(Continued)

*Primary Examiner* — Kris E Mackes
(74) *Attorney, Agent, or Firm* — Weitzman Law Offices, LLC

(57) ABSTRACT

A topology aware distributed storage system includes a plurality of storage nodes, at least one client node, and a storage manager and metadata store. A user-defined storage policy specifies where data is stored within a topological hierarchy of nodes within the network. A hierarchical ring topology including a hierarchical structure of rings representing an organizational structure of nodes is computed and flattened into a single global ring divided into segments corresponding to a unique range of integers and associated with a replica set responsible for storing a key corresponding to one of the integers. A hash function is performed on a user key received from the client node, and the hashed key is looked up on the flattened global ring stored on each storage node to identify the replica set responsible for storing data corresponding to the hashed key.

21 Claims, 12 Drawing Sheets

(56) References Cited

U.S. PATENT DOCUMENTS

| | | |
|---|---|---|
| 2010/0228848 A1 | 9/2010 | Kis |
| 2011/0082928 A1 | 4/2011 | Hasha et al. |
| 2012/0185437 A1 | 7/2012 | Pavlov et al. |
| 2012/0284317 A1 | 11/2012 | Dalton |
| 2012/0300676 A1 | 11/2012 | Welin et al. |
| 2013/0097223 A1 | 4/2013 | Mishkevich et al. |
| 2013/0185258 A1 | 7/2013 | Bestler et al. |
| 2013/0191437 A1 | 7/2013 | Itoh |
| 2013/0268644 A1 | 10/2013 | Hardin et al. |
| 2013/0318222 A1 | 11/2013 | Luong et al. |
| 2014/0081918 A1 | 3/2014 | Srivas et al. |
| 2014/0188816 A1 | 7/2014 | Serlet et al. |
| 2015/0350079 A1* | 12/2015 | Chen .................. H04L 45/7453 709/238 |
| 2016/0179642 A1* | 6/2016 | Cai ..................... G06F 11/2033 714/4.12 |
| 2016/0350226 A1* | 12/2016 | Agarwal ............. G06F 12/0864 |

OTHER PUBLICATIONS

Karger et al., "Consistent Hashing and Random Trees: Distributed Caching Protocols for Relieving Hot Spots on the World Wide Web," Proceedings of the 29th ACM Symposium on Theory of Computing (STOC), pp. 654-663 (1997).

Ganesan et al., "Canon in G Major: Designing DHTs with Hierarchical Structure", ICDCS 2004 Proceedings of 24th International Conference on Distributed Computing Systems, pp. 263-272 (IEEE Mar. 24-26, 2004).

* cited by examiner

TOPOLOGY AWARE DISTRIBUTED STORAGE SYSTEM

CROSS-REFERENCE TO RELATED APPLICATION

This application claims the priority benefit of U.S. Provisional Patent Application No. 62/163,529, filed May 19, 2015, which is incorporated herein by reference in its entirety as if fully set forth herein.

BACKGROUND

1. Field

This disclosure relates generally to computer networks and, more particularly, to a scalable, high-throughput data storage and coordination mechanism for use in distributed applications.

2. Background

The high degree of networking among computer systems and the need to support distributed applications has led to the use of distributed data storage networks. Distributed data storage networks include a plurality of storage nodes and provide a plurality of clients with storage areas. The storage nodes may be connected to each other through a network. In response to a client storing data in the distributed storage system, the distributed storage system stores the data in such a way to distribute a predetermined number of replicas of the data to other storage nodes. Such data replication may enable faster retrieval of the data because the data can be retrieved from the node that is closest or fastest. Data replication may also result in increased available network bandwidth by reducing the need to forward data requests and data transfers throughout the network. Data replication may also increase the fault tolerance of an application, since if one node fails, the necessary data can still be obtained from another node that is still operational.

Some known data storage applications have employed distributed hash tables (DHTs) for storing data. Some examples DHTs include Chord, Content-Addressable Network (CAN), Pastry, Tapestry, Symphony, Kademlia, and Dynamo. In conventional DHTs such as Chord, a hash key generated from the data to be stored must be passed sequentially from node-to-node around a ring of computing nodes until a "matching" node is identified where the data is stored. The data is then stored on the matching node and metadata is created to maintain the location of the stored data. To retrieve the stored data, a hash key is generated from the request, the metadata is accessed using the hash key to identify the node on which the data is stored, and the data is read from the identified node.

As distributed data storage networks have become larger and more complex, however, the issue of storage management has become a great challenge. There is a need for distributed storage and coordination of vast amounts of data on a network that can support tens of thousands of simultaneous clients and thousands of storage servers without sacrificing performance as the system scales.

SUMMARY

In one aspect of this disclosure, a topology aware distributed storage system, includes a plurality of storage nodes for storing key-value data, each storage node including a storage daemon executed by at least one processor, at least one client node to provide user access to the storage system, and a storage manager and metadata store to coordinate retrieval and storage of data in the storage nodes. The storage nodes, at least one client node and storage manager and metadata store are operatively connected to each other over a network. The storage manager and metadata store includes program instructions executed by one or more processors to receive at least one user-defined storage policy specifying where data is stored within a topological hierarchy of nodes within the network, the at least one user-defined storage policy specifying the number and location of replicas. A hierarchical ring topology of the network is computed based on the at least one user-defined storage policy, the hierarchical ring topology including a hierarchical structure of rings representing an organizational structure of nodes within the network. The computed hierarchical ring topology is flattened into a single global ring, the global ring being divided into segments according to the at least one user-defined storage policy, each segment corresponding to a unique range of integers and associated with a replica set responsible for storing a key corresponding to one of the integers in the unique range of integers for the segment. The flattened global ring is stored in the metadata store. The storage daemon running on each storage node causes the at least one processor to retrieve a copy of the flattened global ring from the metadata store and store the copy in memory of the storage node. A hash function is performed on a user key received from the at least one client node and the hashed key is looked up on the stored copy of the flattened global ring to identify the replica set responsible for storing data corresponding to the hashed key.

In another aspect of this disclosure, a computer-implemented method is disclosed for receiving and storing data in a distributed storage system that includes a plurality of storage nodes, at least one client node and a storage manager and metadata store operatively connected to each other over a network. At least one user-defined storage policy specifying where data is stored within a topological hierarchy of nodes within the network is received using one or more processors of the storage manager and metadata store, the at least one user-defined storage policy specifying the number and location of replicas. A hierarchical ring topology of the network is computed based on the at least one user-defined storage policy, the hierarchical ring topology including a hierarchical structure of rings representing an organizational structure of nodes within the network. The computed hierarchical ring topology is flattened into a single global ring, the global ring being divided into segments according to the at least one user-defined storage policy, each segment corresponding to a unique range of integers and associated with a replica set responsible for storing a key corresponding to one of the integers in the unique range of integers for the segment. The flattened global ring is stored in the metadata store. A copy of the flattened global ring is retrieved by each storage node from the metadata store and stored in memory of each storage node. A hash function is performed on a user key received from the at least one client node, and the hashed key is looked up on the stored copy of the flattened global ring to identify the replica set responsible for storing data corresponding to the hashed key.

BRIEF DESCRIPTION OF THE DRAWINGS

This disclosure is further described in the detailed description that follows, with reference to the drawings, in which.

DESCRIPTION

An improved technique for data storage employs a scalable, high-throughput data storage and coordination mechanism (referred to herein as "SilverKing") designed for use in distributed storage applications. SilverKing provides both a key-value interface and snapshot file system support.

SilverKing is designed to support extremely demanding distributed storage and coordination. Many tens of thousands of clients may simultaneously utilize a common SilverKing instance. This allows SilverKing to support the most demanding "Big Data" applications in addition to less-demanding distributed applications. Specifically, SilverKing provides scale and performance along many dimensions, such as (but not limited to):

Operation throughput: many tens of millions of operations per second for large instances Data throughput: limited by the network for large data items Latency: <200 us average for sustained operations contained within a rack Clients: at least tens of thousands of concurrent writers (and readers) for large instances Storage: limited by the aggregate capacity of all hard drives in use.

Extreme scale—SilverKing supports many tens of thousands of simultaneous clients, at least thousands of storage servers, and storage limited by the aggregate capacity of the server disks.

Rich topology support—Users can directly specify high level storage policies, such as, for example: "Primary replicas in New York and London. Secondary replicas in all other regions. Within each regional data center, each primary value must be stored in two racks, and every rack must have a secondary replica."

Speed—SilverKing is as fast as the best RAM-only distributed key-value store, but also supports disk storage.

Memory efficiency—SilverKing is more memory efficient than existing commercially available RAM-only key-value stores.

Coordination primitives—In addition to pure storage, SilverKing supports Linda-like coordination primitives, which makes writing distributed applications far easier than with conventional techniques.

Incast avoidance—SilverKing mitigates against TCP-incast induced failure, which is common in distributed storage systems. Incorporating DCTCP+ into data centers provides SilverKing with robust, low-latency TCP performance. This eliminates long tails on jobs due to TCP-induced file system slowness.

Scale out existing vendor file systems—The SilverKing File System (SKFS) enables snapshot-capable file systems (e.g., NetApp's WAFL) to scale out far more powerfully and more economically than with vendor solutions alone. In production, this enables NetApp volume snapshots to be used on large computational grids. This could be used, for example, to scale out an existing vendor volume for use on a Hadoop® cluster.

SilverKing File System (SKFS)—SKFS inherits the SilverKing key-value store's scale, speed and topology support. In particular, SKFS is dramatically faster than a Hadoop® Distributed File System (HDFS).

Figure 1:
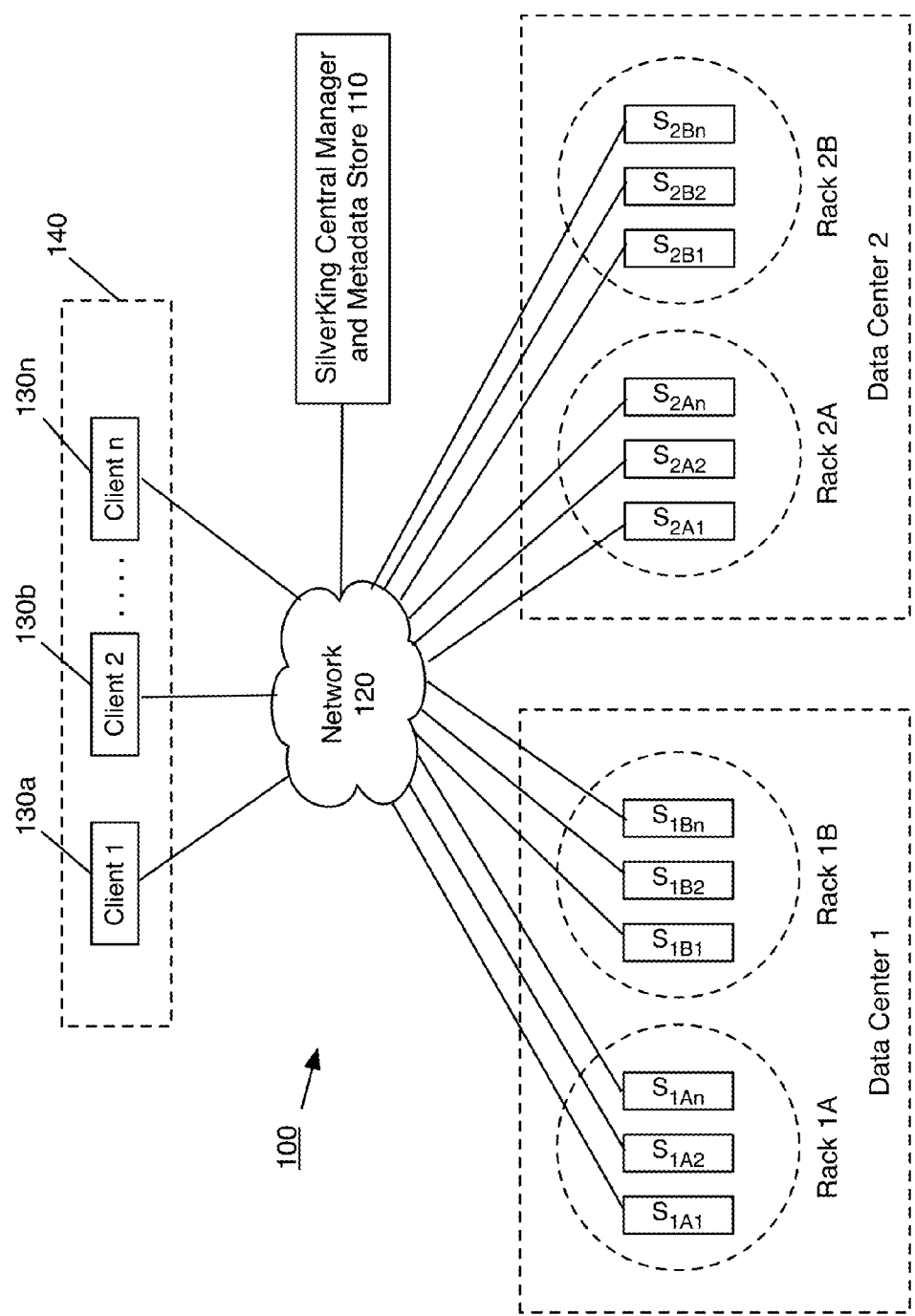
FIG. 1 illustrates a representative distributed data network for implementing distributed data storage.

FIG. 1 illustrates a representative distributed data network 100 for implementing data storage with the SilverKing Central Manager and Metadata Store 110. The distributed data network 100 includes multiple client nodes (e.g., computing nodes) 130a, 130b . . . 130n connected to network 120. The network 120 can be any type of wired or wireless network, including one or more wide area networks (WANs), local area networks (LANs), corporate intranets, Internet, or any other computer network through which the computing system may connect to or otherwise communicate with other computers and databases. The client nodes 130a, 130b . . . 130n may be nodes residing on one or more intermediary networks 140 (e.g., a LAN) that are connected to network 120.

The client nodes 130a, 130b . . . 130n may be servers, laptop computers, desktop computers, tablets, smart phones, PDAs or any other suitable device. Each client node 130a, 130b . . . 130n run client applications or programs 350 (FIG. 3) executed by one or more processors. While three client nodes 130a, 130b . . . 130n are illustrated in FIG. 1, it is understood that the distributed data network 100 may include any number of client nodes, which in large-scale applications can be tens of thousands of client nodes.

The distributed data network 100 also includes storage nodes for storing data. The storage nodes can, for example, be servers within one or more racks located in one or more data centers. Two representative data centers, Data Center 1 and Data Center 2, are illustrated in FIG. 1. These data centers may be geographically remote from each other, such as, for example, Data Center 1 being located in New York and Data Center 2 being located in London. One or more racks 1A, 1B, 2A, 2B of servers connected to network 120 may be located in each data center. For example, as illustrated in FIG. 1, Data Center 1 includes two racks 1A and 1B. Rack 1A includes storage nodes $S_{1A1}, S_{1A2} \ldots S_{1An}$, and Rack 1B includes storage nodes $S_{1B1}, S_{1B2} \ldots S_{1Bn}$. Similarly, Data Center 2 includes two racks 2A and 2B. Rack 2A includes storage nodes $S_{2A1}, S_{2A2} \ldots S_{2An}$, and Rack 2B includes storage nodes $S_{2B1}, S_{2B2} \ldots S_{2Bn}$.

While only two data centers, each including two racks of three servers, are illustrated in FIG. 1, it is understood that distributed data network 100 may include any number of data centers containing multiple racks of storage nodes. As mentioned above, SilverKing can support at least thousands of storage servers. It is also understood that some or all of the client and storage nodes may be collocated even though they are shown as logically distinct in FIG. 1.

Figure 2:
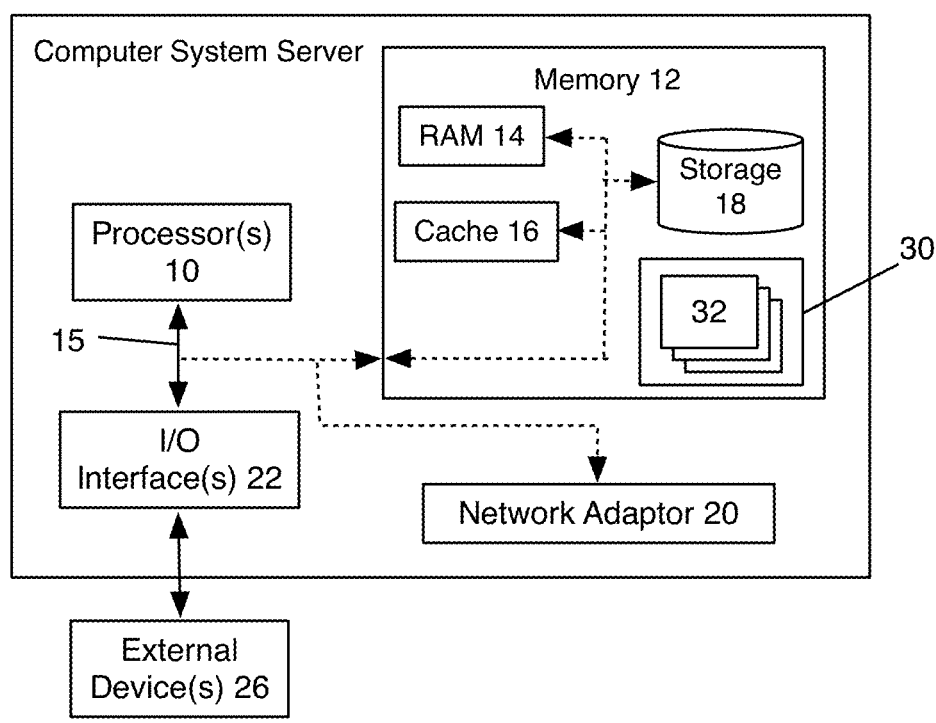
FIG. 2 illustrates, in simplified form, a schematic representation of an illustrative server capable of implementing distributive data storage.

The client nodes 130a, 130b . . . 130n and storage nodes $S_{1A1}$, $S_{1A2}$ . . . $S_{1An}$, $S_{1B1}$, $S_{1B2}$ . . . $S_{1Bn}$, $S_{2A1}$, $S_{2A2}$ . . . $S_{2An}$, $S_{2B1}$, $S_{2B2}$ . . . $S_{2Bn}$ are all well known and thus will not be described in detail. A representative server node is illustrated in FIG. 2. Each client node and storage node includes at least one processor(s) 10 coupled to memory 12, in the form of, for example, RAM 14, ROM, program storage 32, cache 16, buffers, etc. so that the processor(s) 10 can execute programs 32 and access data. Long-term storage 18 may be provided as a more permanent form of memory, and may be, for example, a hard disk, optical disk, flash memory, solid-state memory, tape, or any other type of memory. A bus 15 couples various system components including system memory 12 to processor(s) 10.

The client and storage nodes also include a network adapter 20 to provide access to and communicate over the network 120, and input/output (I/O) interface(s) 22 that permit user interaction with other external devices 26, such as (but not limited to) a display, mouse, keyboard, touch screen, digital stylus, voice input/output, etc.

Program/utility 30, having a set (at least one) of program modules 32, may be stored in memory 12 by way of example, and not limitation, as well as an operating system, one or more application programs, other program modules, and program data. Each of the operating system, one or more application programs, other program modules, and program data or some combination thereof, may include an implementation of a networking environment. Program modules 32 generally carry out the functions and/or methodologies of embodiments as described herein.

Applications or programs 350 (FIG. 3) running on one or more client nodes 130a, 130b . . . 130n in the distributed data network 100 may store data in and access data stored in the storage nodes $S_{1A1}$, $S_{1A2}$ . . . $S_{1An}$, $S_{1B1}$, $S_{1B2}$ . . . $S_{1Bn}$, $S_{2A1}$, $S_{2A2}$ . . . $S_{2An}$, $S_{2B1}$, $S_{2B2}$ . . . $S_{2Bn}$ using the SilverKing Central Manager and Metadata Store 110, which controls and coordinates retrieval and storage of data in storage nodes of the distributed data network 100. The SilverKing Central Manager and Metadata Store 110 includes one or more servers that communicate with other nodes on the distributed data network 100 over network 120. While the SilverKing Central Manager and Metadata Store 110 is illustrated in FIG. 1 as being physically separated from the storage nodes, it is understood that the SilverKing Central Manager and Metadata Store 110 could be collocated with one or more storage nodes and even incorporated within one or more storage nodes.

Figure 3:
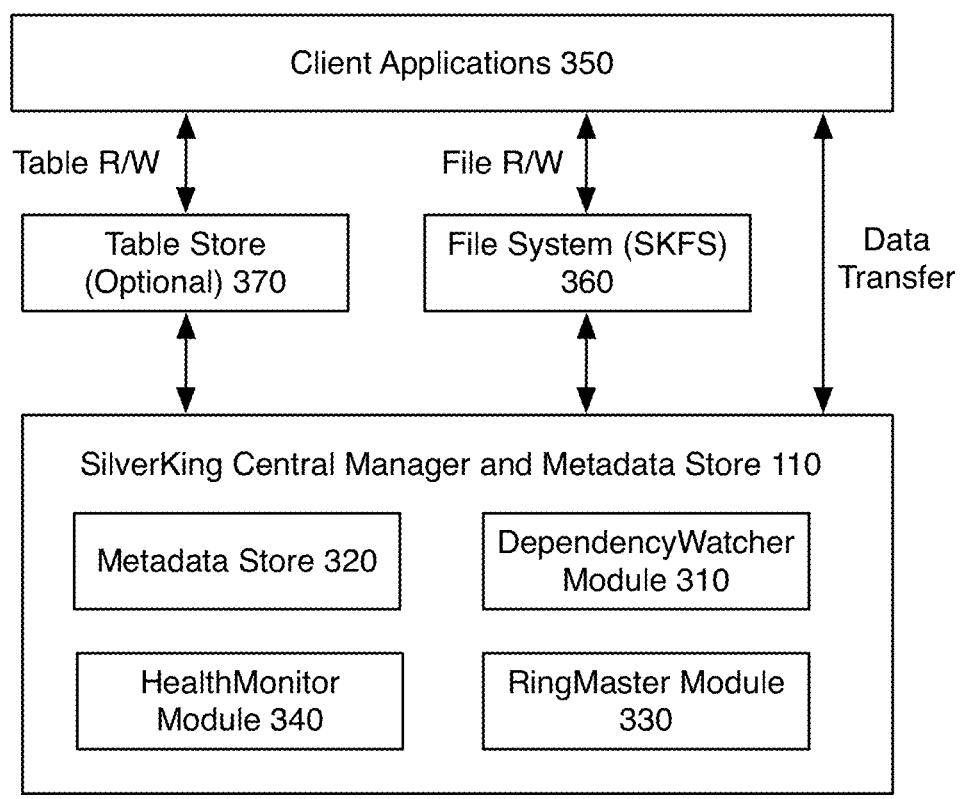
FIG. 3 illustrates, in simplified form, a high level representation of a central manager and metadata store capable of implementing distributive data storage.

Referring to FIG. 3, the SilverKing Central Manager and Metadata Store 110 includes program modules stored in memory that are executed by one or more processors. As will be described below, the SilverKing Central Manager and Metadata Store 110 allows data to be stored in and retrieved from the storage nodes in the distributed data network 100. In addition, the SilverKing Central Manager 110 can optionally read/write files in the SilverKing File System (SKFS) 360. The SKFS 360 provides a highly scalable file system by leveraging the key-values maintained in the key-value store. The SilverKing Central Manager 110 can also read/write tables in an optional table store 370.

As will be described below, the SilverKing Central Manager and Metadata Store 110 includes a DependencyWatcher module 310, metadata store 320, RingMaster module 330, and HealthMonitor module 340.

The DependencyWatcher module 310 is a daemon or other software process that computes the topology of the distributed data network 100 based on a user-defined hierarchical structure of "rings" that reflect the "real world" organizational structure of the network, flattens the map, and stores it in the metadata store 320, which can be, for example, a resilient cluster (e.g., a Paxos-like system or Apache ZooKeeper™).

A topology defines a logical hierarchical relationship between entities, such as servers, racks, data centers, etc. A topology is typically constructed to reflect underlying physical constraints such as network latency, failure correlation, etc. A topology is a user-defined hierarchy that is typically used to mirror the physical world or network connectivity between computer systems in the physical world. A topology includes a series of "nodes" linked in a hierarchy. Each node has a name and a type, and is linked to one or more children and, at most, one parent. Each node is defined using "type: name" syntax, and children are defined within a parent node's definition.

A "ring" is a logical structure with which key-value pairs are associated. This structure is realized using a range of the integers [0, ring upper limit), so that each key to be stored in the ring is mapped to one of these integers. The rings are associated with nodes in a topology, and each non-leaf element in a topology may have a ring associated with it. The node in the topology is referred to as the ring's "owner." The topological children of the owner are "members" of the ring. Each ring is divided into segments that are "owned" by ring members. The segment owners are responsible for storing all data in the segment.

The keys that users utilize to store and retrieve data objects can be arbitrary binary objects. Internally, each of these user level keys is mapped to an internal key that is represented as a very large integer. User keys are mapped to internal keys using a strong hash function that guarantees that the probability of any two user keys mapping to the same internal key to be extremely low; zero, for all practical purposes. In this way, internal keys can be treated as if they are the user key.

Representing internal keys as integers allows SilverKing to easily represent a map of where keys are stored. This is done using a "ring" structure, where the ring represents a range of integers between zero and a very large number. This ring is cut up into segments (representing ranges of integers) and each segment is associated with a replica set.

Figure 4:
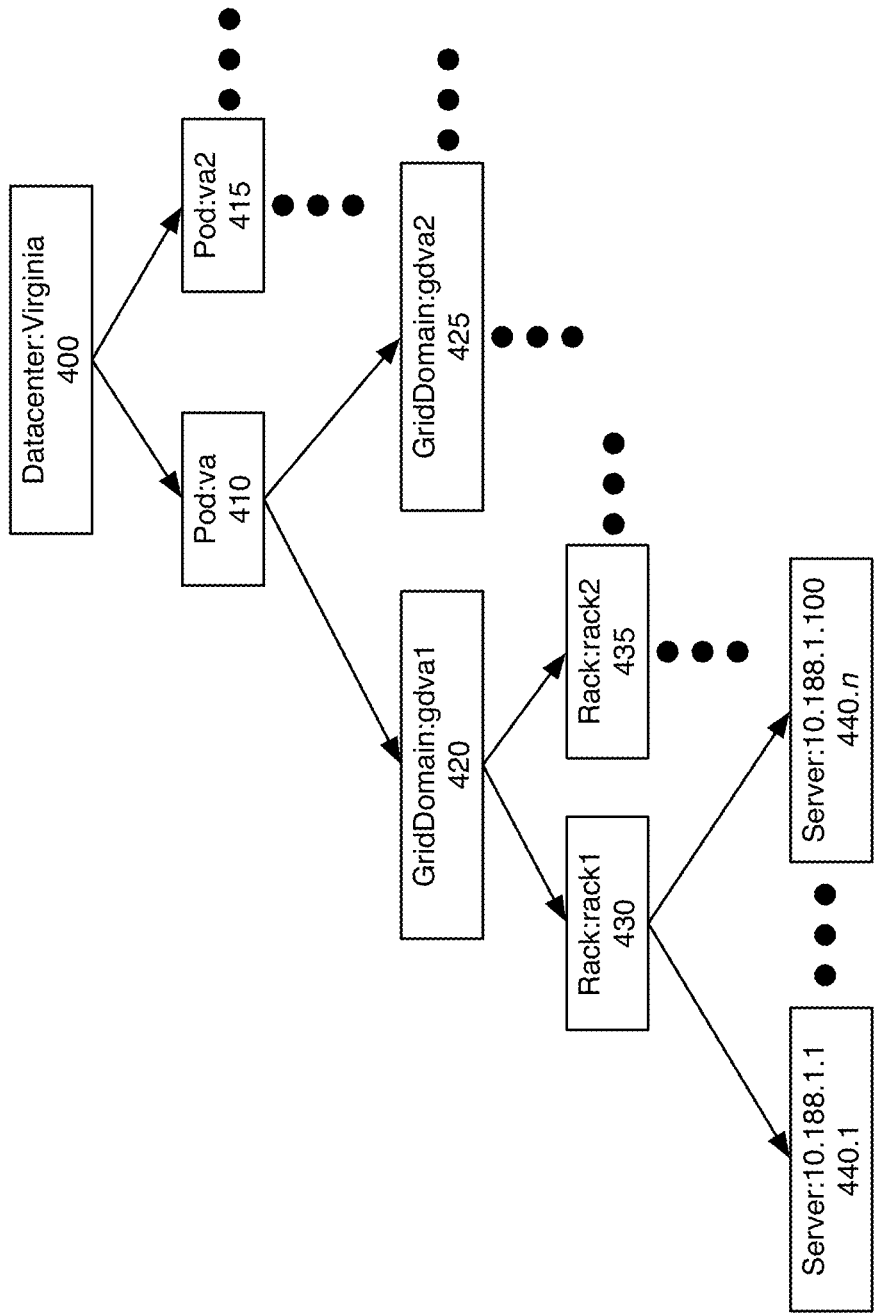
FIG. 4 illustrates, in simplified form, a representative hierarchical topology in a data center.

For instance, FIG. 4 illustrates a representative hierarchical topology showing Datacenter:Virginia 400 as the highest level. Pod:va1 410 and Pod:va2 415 form the second level branching off of the Datacenter:Virginia 400. Within Pod:va1 410 are GridDomain:gdva1 420 and GridDomain:gdva2 425, which form the third level in the hierarchy. Within GridDomain:gdva1 420 are racks Rack:rack1 430 and Rack:rack2 435, which form the fourth level in the hierarchy. Within Rack:rack1 430 are servers Server:10.188.11 440.1 through Server:10.188.1.100 440.n, which form the lowest tier in the hierarchical topology.

Figure 5:
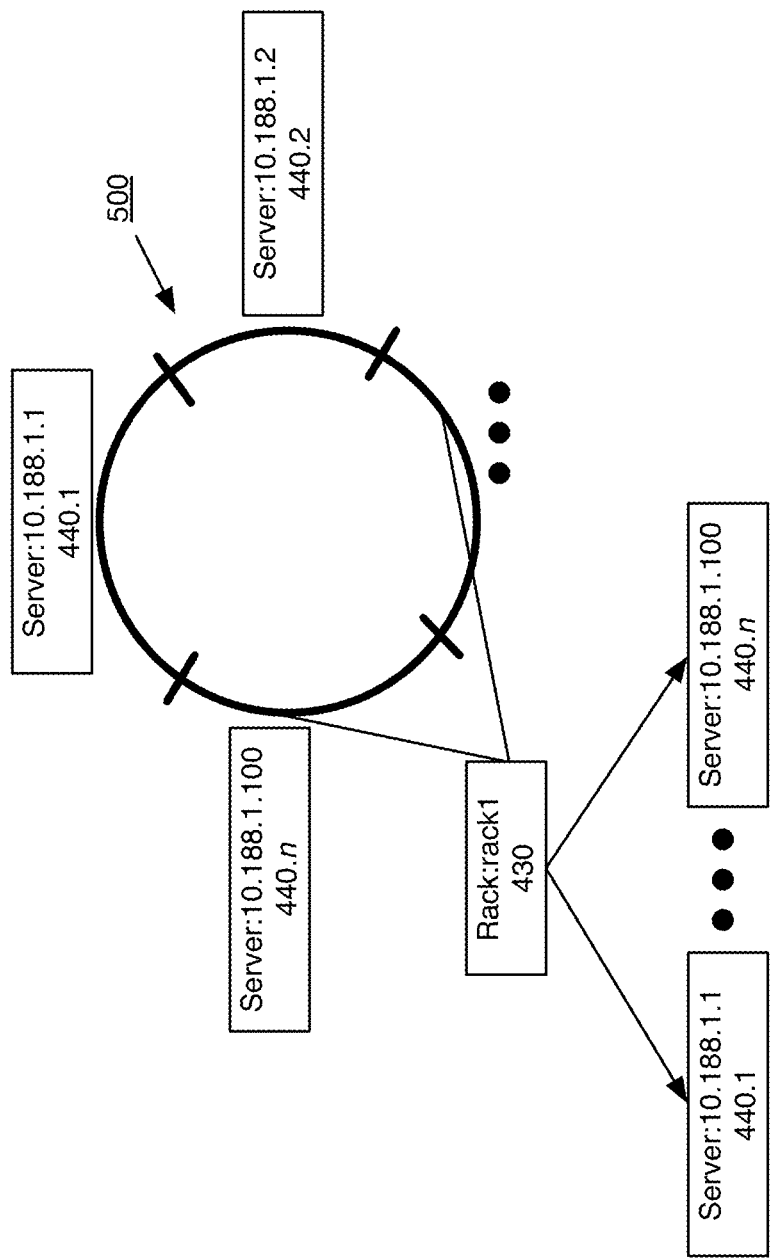
FIG. 5 illustrates a representative ring topology associated with a rack of servers.

Referring to FIG. 5, the rack Rack:rack1 430 in the example topology of FIG. 4 may have a ring 500 associated with it where the servers Server:10.188.1.1 440.1 through Server:10.188.1.100 440.n in the rack are the ring members. As all data is physically stored on servers, all rings with higher-level nodes in the topology must be composed with lower-level rings until a ring with only storage nodes (e.g., servers) as members is obtained. This is referred to as "flattening" the ring topological hierarchy.

This composed ring 500 is used to store data. A ring may be specified as a topology, an owner (node instance) for the ring within the topology, an exclusion list, and two additional constructs: weights and storage policy. Exclusions define a list of servers that should not be included in any ring. Adding a server to the exclusion list precludes data from being stored on the server. This is typically done when the server is not functioning correctly or needs to be taken out of active use for some reason.

A weight is a positive real number associated with each member of a ring. The total size of the segments owned by each member—and hence the members' share of the overall data—is proportional to their weights. Unless otherwise specified, the default weight is preferably 1.0.

A storage policy is a user-defined policy that defines how data is stored within a ring. Each value is stored in one or more members of the ring using replication. A storage policy specifies how each data item must be "stored" at each level of the ring (physical storage only takes place on servers). Specifically, a user-defined storage policy specifies how many "primary" replicas and how many "secondary" replicas are used at the given level of the ring. "Primary" replicas must store the data item or object. "Secondary" replicas may attempt to store data items or objects, but are not required to, and are often used to improve performance when remotely accessing data. In addition, storage policies allow the "binding" of specific members of the ring.

By way of example, the following illustrative user-defined storage policy applies for data stored to a pod. This illustrative storage policy specifies that each data item must contain a "primary" replica in one rack and should contain a "secondary" replica in another rack. Within each rack, only a single replica is used. In addition, the user-defined storage policy may be an "unbound" policy in which the user specifies that each object needs to be stored in a specific number of replicas without specifying which exact replicas should be used.

| Unbound Policy |
|---|
| Pod:PodTestPolicyUnbound { <br>    primary { <br>        1 of Rack:RackTestPolicy <br>    } <br>    secondary { <br>        1 of Rack:RackTestPolicy <br>    } <br>} <br>Rack:RackTestPolicy { <br>    primary { <br>        1 of Server <br>    } <br>} |

Like the previous example, the following user-defined storage policy applies to data stored in a pod. This illustrative policy, however, requires two "primary" replicas to be stored—one in rack R1 and one in rack R2. In addition, a "secondary" replica should be stored in another rack. Within each rack, one replica is required and another is desired. In this example storage policy below, the user specified precisely which replicas should be used ("bound" replicas.)

| Bound Policy |
|---|
| Pod:PodPolicyBound { <br>    primary { <br>        1 of Rack:RackTestPolicy:{R1}, <br>        1 of Rack:RackTestPolicy:{R2} <br>    } <br>} |

| Bound Policy |
|---|
|     secondary { <br>        1 of Rack:RackTestPolicy <br>    } <br>} <br>Rack:RackTestPolicy { <br>    primary { <br>        1 of Server <br>    } <br>    secondary { <br>        1 of Server <br>    } <br>} |

As storage takes place only on servers, a storage policy is "resolved" to a server-level map of the ring. Storage-policy resolution operates on each parent node in the topology. For each parent node, a map (ring) must be created that can map any given key to a replica set that consists of children of this parent (i.e., not necessarily servers). To accomplish this, a ring is constructed for each parent that concretely maps any given internal key to a replica set. After final resolution down to a server-level ring map, each ring segment is associated with a list of primary and secondary replicas as shown below. Using this map, it is possible to know exactly what primary and secondary servers should store any given key.

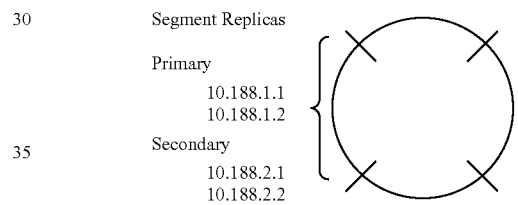

Segment Replicas

Primary
    10.188.1.1
    10.188.1.2
Secondary
    10.188.2.1
    10.188.2.2

Secondary replicas may be populated with values in one of three ways: "periodically," "eagerly" or "lazily." "Periodic" replication is accomplished as follows. Periodically, secondary replicas request summaries of keys and versions stored on the primary replicas. These summaries are not lists of all keys and all versions stored on the primary replica, but are a function of all keys and versions stored on the primary replicas. As a result, if the primary replica contains a key or a version of a key that is not contained in the secondary replica, the secondary replica is able to determine this. The summary may enable the secondary replica to directly compute which key or version is missing, or it may enable the secondary replica to issue a request for a summary in a region of ring-space that is less than the original request. Through repeated use of the request and comparison mechanisms, the secondary replica is able to determine exactly which keys and versions it is missing. The secondary replica then obtains the missing values by requesting them from the primary replica.

"Eager" replication is accomplished by storing data in secondary replicas whenever data is stored in primary replicas. SilverKing allows eager replication to either occur to all secondary replicas, or to secondary replicas within a specific topological unit. This specification may be to topological units relative to the client issuing the storage operation or they may be absolute. For example, storage operation to a primary replica in a New York data center could specify that data should be "eagerly" replicated to all secondary replicas within the current data center (which would be New York in this example; this is a relative request), as well as to all secondary replicas in the London data center (this is an absolute request).

"Lazy" replication occurs during read operations. Read operations may first look for data at a secondary replica. If data is not found on the secondary replica, the read operation will fetch data from a primary replica. Lazy replication may specify that, in the event that a "read miss" occurs at a secondary replica, the data should be stored at specific secondary replicas. As with "eager" replication, this specification may be either relative or absolute. For example, a read operation to a secondary replica in Tokyo may specify that all "read misses" on the secondary replica should result in all secondary replicas within the local data center (Tokyo in this example; this is a relative request) being populated with the data found in the primary replica. This read operation may also specify that all "read misses" should result in that data being stored at all secondary replicas in the Hong Kong data center (this is an absolute request).

Obtaining a usable replica set from a given storage policy requires two fundamental steps. First the storage policy must be "resolved" and then "flattened." All of these stages work using an internal key and ring structure discussed below.

Figure 6:
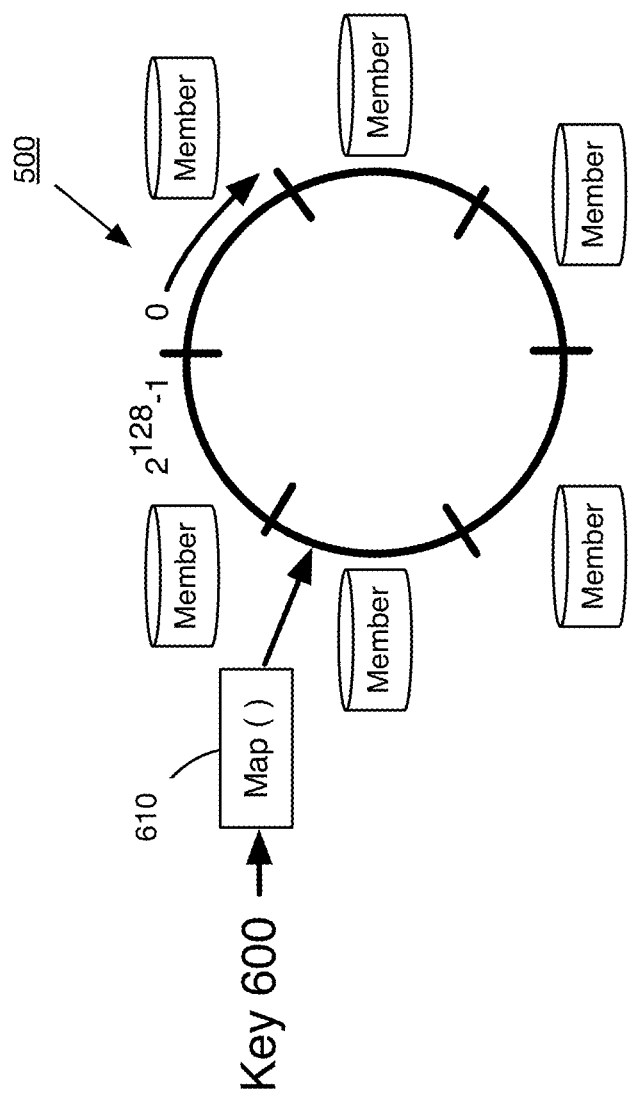
FIG. 6 illustrates, in simplified form, static mapping of keys to ring members.

Referring to FIG. 6 and as previously discussed, the key 600 that a user uses to store and retrieve data objects can be arbitrary binary objects. Internally, each of these user level keys is mapped to an internal key 610 that is represented as a very large integer. User keys 600 are preferably mapped to internal keys 610 using a strong hash function that guarantees that the probability of any two user keys mapping to the same internal key to be extremely low—zero, for all practical purposes. In this way, the internal keys 610 can be treated as if they are the user key 600.

Figure 7:
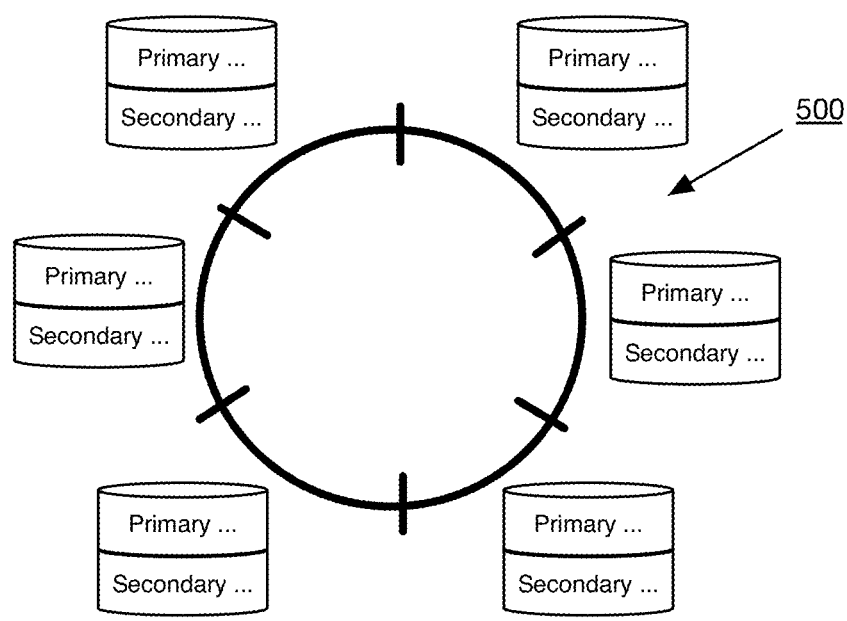
FIG. 7 illustrates, in simplified form, mapping of replica types to ring members.

Representing internal keys 610 as integers allows SilverKing to easily represent a map of where keys are stored. As discussed above, this is accomplished using a "ring" structure 500, where the ring 500 represents a range of integers between zero and a very large number. This ring 500 is cut up into segments (representing the ranges of integers) and each segment is associated with a replica set. As illustrated in FIG. 7, the replica sets in a given segment can be a "primary" or "secondary" replica. As discussed above, "primary" replicas must store the data item or object. "Secondary" replicas may attempt to store data items or objects, but are not required to, and are often used to improve performance when remotely accessing data.

Referring again to FIG. 6, storage-policy resolution operates on each parent node in the topology. For each parent node, a map (ring) must be created that can map any given key 610 to a replica set that consists of children of this parent (i.e., not necessarily servers). To accomplish this, a ring 500 is constructed for each parent that concretely maps any given internal key 610 to a replica set.

When policy resolution is complete, each parent node will have a ring associated with it. While this is sufficient to perform storage and retrieval of data objects, doing so would require walking the topology from the top-level node to the bottom level nodes and performing translations at each level. For performance reasons, this is eliminated by computing a single ring 500 up front that combines the hierarchy of rings into a single ring. As previously stated, this step is called ring "flattening." When flattening is complete, a single ring 500 is obtained that associates any given key 610 with a replica set that is responsible for storing this key.

Figure 8:
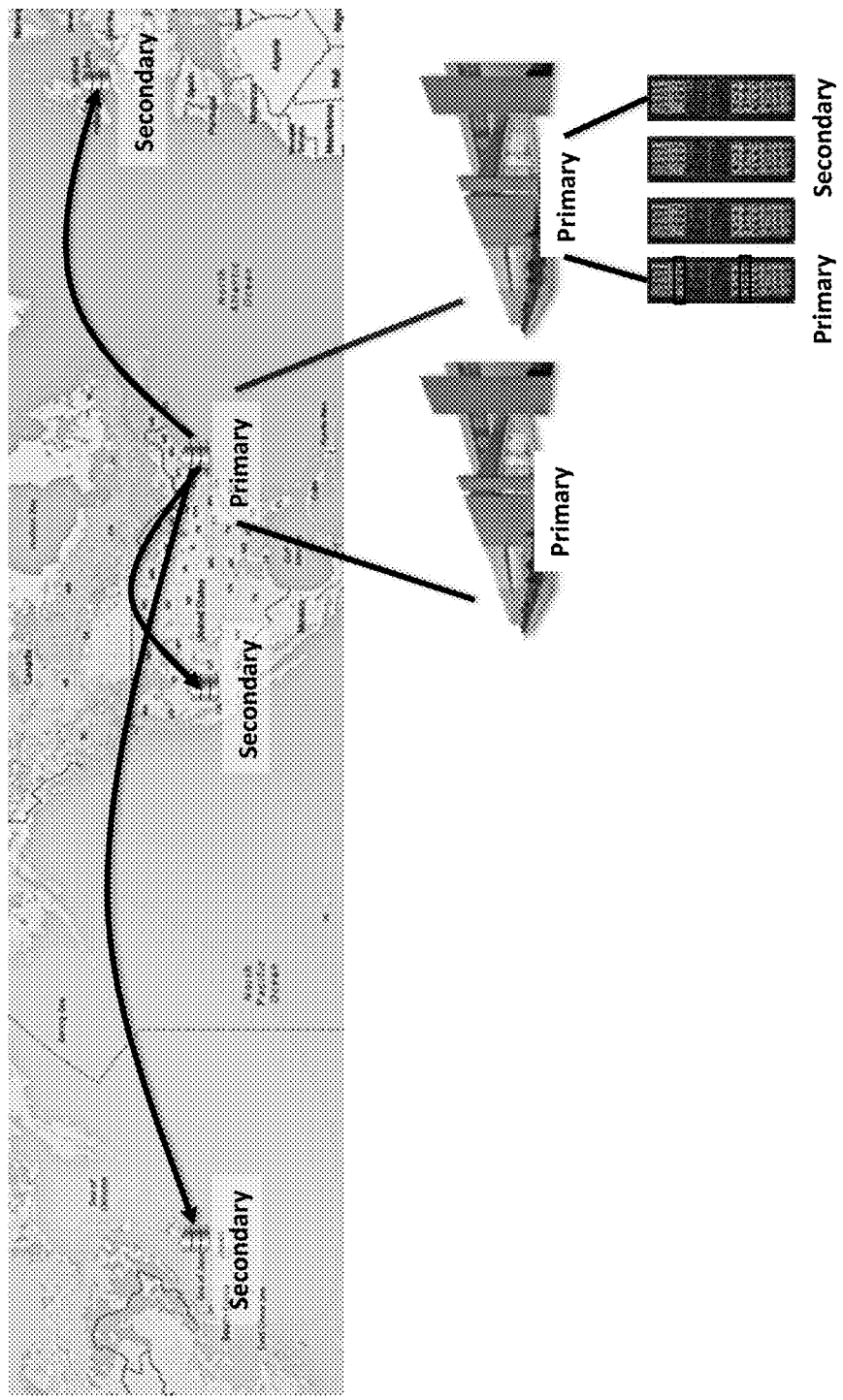
FIG. 8 illustrates, in simplified form, an example topology for storing primary and secondary replicas.

FIG. 8 illustrates, in simplified form, an example topology for storing primary and secondary replicas based on user-defined storage policies. The storage policies provide powerful control over how and where data is stored at every level in the topology. The storage policies allow for selectable eager, lazy or periodic secondary replication, and allows the storage of data close to where it will be used. For instance, in the example shown in FIG. 8, a user-defined storage policy may require storage of any given data object in a primary replica in New York, with optional secondary replicas in London, San Jose and Tokyo.

Figure 9:
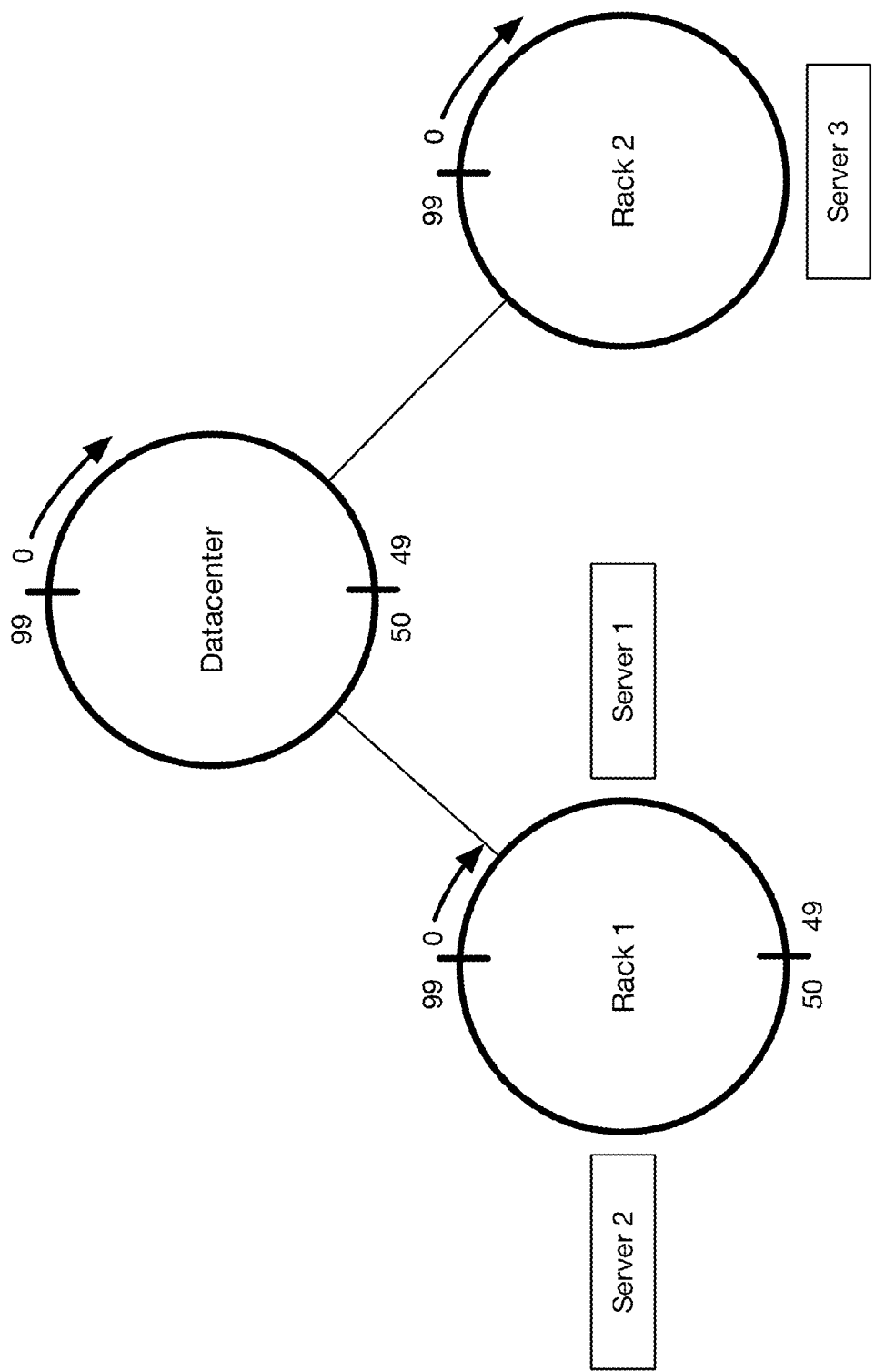
FIG. 9 illustrates a simplified example of a hierarchical ring topology before being flattened.
Figure 10:
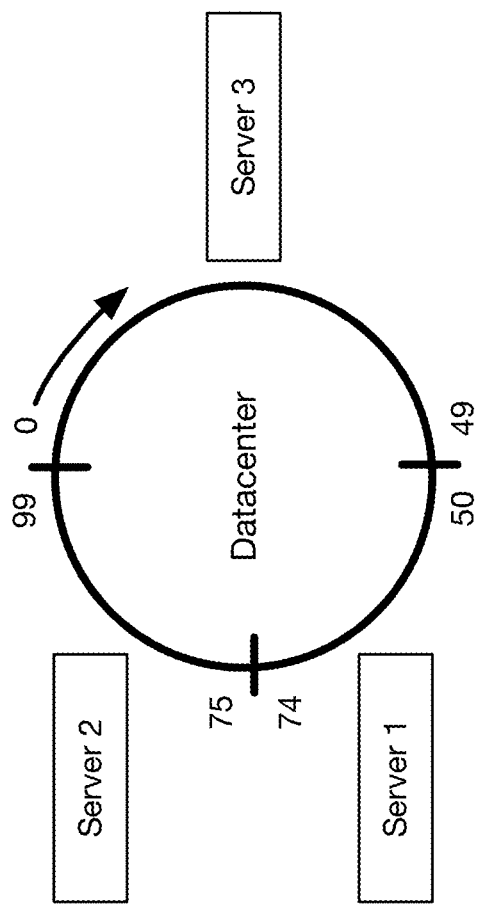
FIG. 10 illustrates a flattened map of the hierarchical ring topology of FIG. 9.

FIGS. 9 and 10 illustrate a simplified example of how flattening works. In this example, there is a single data center Datacenter with two child racks Rack 1 and Rack 2. Data stored in Datacenter is evenly split between the two racks. Rack 1 has two servers Server 1 and Server 2, which store equal portions of data that is stored within Rack 1. Rack 2 has a single server Server 3 that stores all data that is stored by Rack 2.

FIG. 9 shows how this is represented hierarchically by three rings: one ring for the Datacenter, one ring for Rack 1 and one ring for Rack 2. This hierarchical map could be used directly to locate objects, but doing so would require walking the structure and translating coordinates when transitioning between rings.

Flattening the hierarchical ring structure of FIG. 9 allows replica sets to be located in a single step. After flattening, this map appears as is shown in FIG. 10. This map allows replicas sets (only a single replica here for simplicity) to be located in one step.

For example, if a user desired to store the phone number of "John Doe," the user code might look like put("John Doe", "801.555.1212"). To decide what server will store this data object, the key "John Doe" is hashed to an internal key (a very large integer as discussed above). This internal representation is then mapped onto the flattened ring (e.g., using division or a modulus operation). For example, this internal key might map to the number 57 on the ring shown in FIG. 10. In this case, the server that should store this data object can be identified by consulting the flattened map. Referring to the flattened map in FIG. 10, the region [50,74] is stored by Server 1. Similarly, the user can retrieve the phone number of "John Doe" using get("John Doe"). The same mapping operation identifies that the server responsible for storing that key is Server 1.

The SilverKing Central Manager 110 stores all metadata in the metadata store 320, which can be, for example, a resilient cluster (e.g., a Paxos-like system or Apache ZooKeeper™). Each metadata construct is preferably identified by a name and version. The version may be automatically selected by the metadata store 320 using an auto-versioning feature, such as that currently available in ZooKeeper™.

A namespace defines a logical namespace into which key-value pairs are stored. Each namespace is associated with a storage policy and, in turn, a particular node instance within a topology (the ring owner) as discussed above. Namespaces may be created in one of two ways: explicitly or automatically. Explicit namespace creation occurs when the createNamespace( ) function is called by a client node. This method allows NamespaceOptions (discussed below) specific to this namespace to be specified. Automatic namespace creation occurs when a namespace that has not been explicitly created is first written to. In this case, the default NamespaceOptions for the given key-value pair will be used.

NamespaceOptions specify properties of created namespaces, such as the StorageType and ConsistencyProtocol to be used by a namespace. Explicitly, namespace creation allows users to specify options directly. Automatic creation will use the default NamespaceOptions of the metadata store 320.

Each key-value pair may specify whether it supports only explicit namespace creation, only automatic namespace creation, or both. If both are supported, then a regular expression is specified. This expression is then used to determine when to automatically create a namespace for a put( ) operation that specifies a non-existent namespace.

Preferably, each ring instance is associated with exactly one storage policy. Each storage policy may be associated with multiple ring instances.

Preferably, each key-value pair is only associated with a single ring and, therefore, each key-value pair is also associated with only a single storage policy. Thus, all namespaces within a key-value pair are associated with the same storage policy.

All metadata is preferably versioned and never overwritten in the metadata store 320. A new version is simply added when it is desired to make a change. For metadata that is derived from other base metadata (e.g., a ring), as base metadata changes, dependent metadata is updated accordingly. For instance, as a topology or exclusion list changes, the ring mapping is updated.

In addition to its key, each value stored has a version and a creation time associated with it. Versions may be supplied by users, or generated by the SilverKing Central Manager 110. Creation times are generated by the SilverKing client nodes 130, proxy nodes and/or storage nodes at the time of value creation. This functionality is a superset of the functionality required to support bi-temporal versioning.

Each namespace specifies how the version and creation time are used in NamespaceOptions. For instance, some namespaces may specify that only a single value is ever associated with a key. Other namespaces may allow multiple values to be associated with a single key. Preferably, each namespace specifies a NamespaceVersionMode and a RevisionMode.

NamespaceVersionMode specifies how versions for keys are supplied as follows:
  SINGLE_VERSION—Only a single version may be associated with the value. The version number is undefined and should not be used externally in this case.
  CLIENT_SPECIFIED—Multiple versions of a value may exist. The client must explicitly specify the version.
  SEQUENTIAL—Versions will be generated automatically from the positive integers.
  SYSTEM_TIME_MILLIS—Versions will be generated automatically using the system time in milliseconds.
  SYSTEM_TIME_NANOS—Versions will be generated automatically using the system time in nanoseconds.
  Additional version types may be added.

A revision is the creation of a value with a version<=the latest stored version (creation time is always monotonically increasing). RevisionMode controls whether or not a given namespace allows revisions using the value of either NO_REVISIONS or UNRESTRICTED_REVISIONS.

A SINGLE_VERSION namespace is also "write once" if its revision mode is NO_REVISIONS; otherwise, while there is only a single version associated with any one key, different values may be associated with a key at different creation times.

Retrieval operations may specify which of the potentially several values associated with a given key are retrieved using a VersionConstraint. A VersionConstraint is specified with the following attributes:
  min—The minimum acceptable version inclusive.
  max—The maximum acceptable version inclusive.
  mode—When multiple versions match, selects either the LEAST or GREATEST of these versions.
  maxCreationTime—The maximum creation time allowed (inclusive). A minimum creation time is not specified since value with the maximum matching creation time is always retrieved.

The SilverKing Central Manager and Metadata store 110 supports "live" topology and configuration changes. For instance, it is possible to add or remove storage nodes while SilverKing is running. It is also possible to change the replication level, the fraction of data stored on each server, the topology structure, etc., all without the need to restart SilverKing.

SilverKing instances may need to change topologies for two large classes of reasons: topology changes, and in response to a change in failure status. Topology changes may be the result of a change in the composition of server, a new user-specified topological hierarchy, a change in the weight assigned to topological nodes, a change in the desired level of replication, a change in the secondary replication specification, and so on. New failures will cause nodes to be removed from the topology. Failure resolutions will result in additions to the topology.

Topology changes are handled as follows. First, the HealthMonitor module 340 (FIG. 3) running as a daemon or other software process on the SilverKing Central Manager 110 observes the health of nodes. The HealthMonitor module 340 is responsible for determining when storage nodes have failed and when they are healthy. The storage nodes themselves monitor the storage daemons running on each storage node and post their observations to the central Paxos-like metadata store 320. The HealthMonitor module 340 uses the nodes' observations in determining the health of nodes (e.g., a majority or predefined percentage of nodes have "voted" that a particular node is unhealthy, which may optionally be confirmed by the HealthMonitor module 340 checking the metadata store 320 to see whether the node voted by other nodes as unhealthy submitted a vote itself). In addition, the HealthMonitor module 340 may receive external notifications of node health status (e.g., from a file update or a message) to track the physical health of servers (nodes). The file update may be, for example, a list identifying specific servers (nodes) that are known to have failed. Unhealthy nodes (whether "voted" as such by the other storage nodes monitoring the storage daemon running on the node or identified in a file update as the server having failed) are included in an exclusion list and healthy nodes (if previously included) are removed from the exclusion list.

The DependencyWatcher module 310 is a daemon or software process that observes all inputs that determine the composition of a ring. When any of these inputs change (as described above) or the health status of a server changes (as observed in the exclusion list described above), the DependencyWatcher 310 computes a new topological ring hierarchy, and then a single "flattened" ring is derived from the newly computed hierarchy. This ring is stored in the Paxos-like metadata store 320.

Each SilverKing instance may store data using multiple rings. For simplicity in explaining the concept, this discussion will consider the single ring case. In this example, the RingMaster daemon 330 watches for a new ring generated by the DependencyWatcher daemon 310. Each RingMaster daemon 330 maintains two pointers in the Paxos-like metadata store 320: a current ring and a target ring. Whenever a new ring is observed, the target pointer may be updated to point to the latest ring. This triggers a series of changes in the storage nodes. The storage nodes carefully begin a transition from the old storage ring to the new ring. When this transition is observed to have completed, the RingMaster daemon 330 updates the current ring pointer to point to the target ring. If yet another target ring arrives before the transition is completed, the old transition is abandoned by moving the target ring pointer to the latest ring.

A SilverKing storage daemon (not shown) running on each of the storage nodes transitions from an old ring to a new ring by carefully ensuring that no data is lost during the transition, and by ensuring that all data from the old ring is moved to the corresponding replicas in the new ring before the transition is marked as complete. At a high level, this is accomplished as follows. The storage nodes all march through a series of states. Each node stores its current state in the Paxos-like metadata store 320. Each node observes the state of all other replicas in the same metadata store 320. Nodes do not progress to the next state in the state series until all other nodes are ready to do the same. During the transition process, storage operations store data at both the new and the old storage replicas. Servers in the exclusion list (described above) form an exception to storage operations. When the storage transition is complete, data is stored at the new replicas only.

The same mechanisms that make it possible to support live topology changes, also enable SilverKing to function in the presence of failures (within the realm of what is feasible given the storage policy and level of failure).

Figure 11:
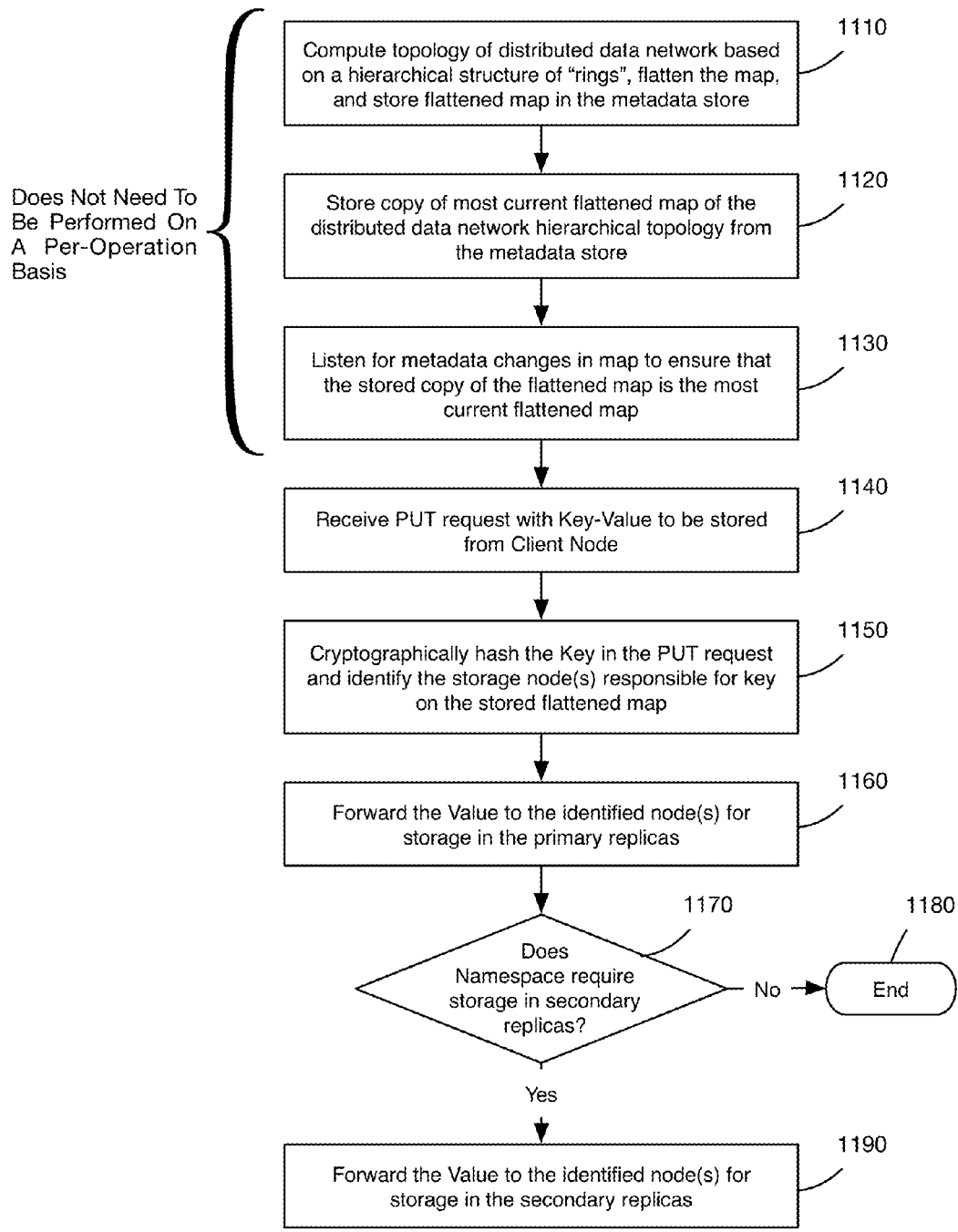
FIG. 11 is a preferred sequence of steps for performing a PUT request in the distributed data storage system.

FIG. 11 illustrates a preferred sequence of steps for performing a PUT request. Referring to Step 1110, the DependencyWatcher module 310 computes the topology of the distributed data network based on a hierarchical structure of "rings" and user-defined storage policies. The computed hierarchical topology is "flattened" to form a single ring representative of the entire system. This flattened map is stored in the metadata store 320 (Step 1110).

The storage daemon running on each node retrieves a copy of most current flattened map from the metadata store and stores the copy in memory on the node (Step 1120). The storage daemon running on each node listens for metadata changes in map to ensure that the stored copy of the flattened map is the most current flattened map (Step 1130). If a new flattened map is generated by the DependencyWatcher module 310, the RingMaster daemon 330 updates the target pointer in the metadata store 320 to point to the latest flattened map, which causes the storage daemon running on each node to transition from the old storage ring to the new ring. This ensures that each storage node stores a copy of the most current flattened map in memory.

It is understood that Steps 1110 through 1130 in FIG. 11 do not need to be performed on a per-operation basis and are preferably performed prior to receipt of the PUT request from a client node.

In operation, a PUT request from a client node is sent over the network 120 to a storage node that acts as a proxy. The PUT request from the client node includes the key-value to be stored (Step 1140). The storage daemon running on the proxy storage node cryptographically hashes the key in the PUT request and identifies the storage node(s) responsible for the key on the most current flattened map stored in the proxy storage node (Step 1150). The storage daemon causes the proxy storage node to forward the value to the identified node(s) for storage in the primary replicas (Step 1160). Depending on the namespace, the storage daemon may also cause the proxy storage node to forward the value to one or more identified node(s) for storage in secondary replicas (Step 1190).

Figure 12:
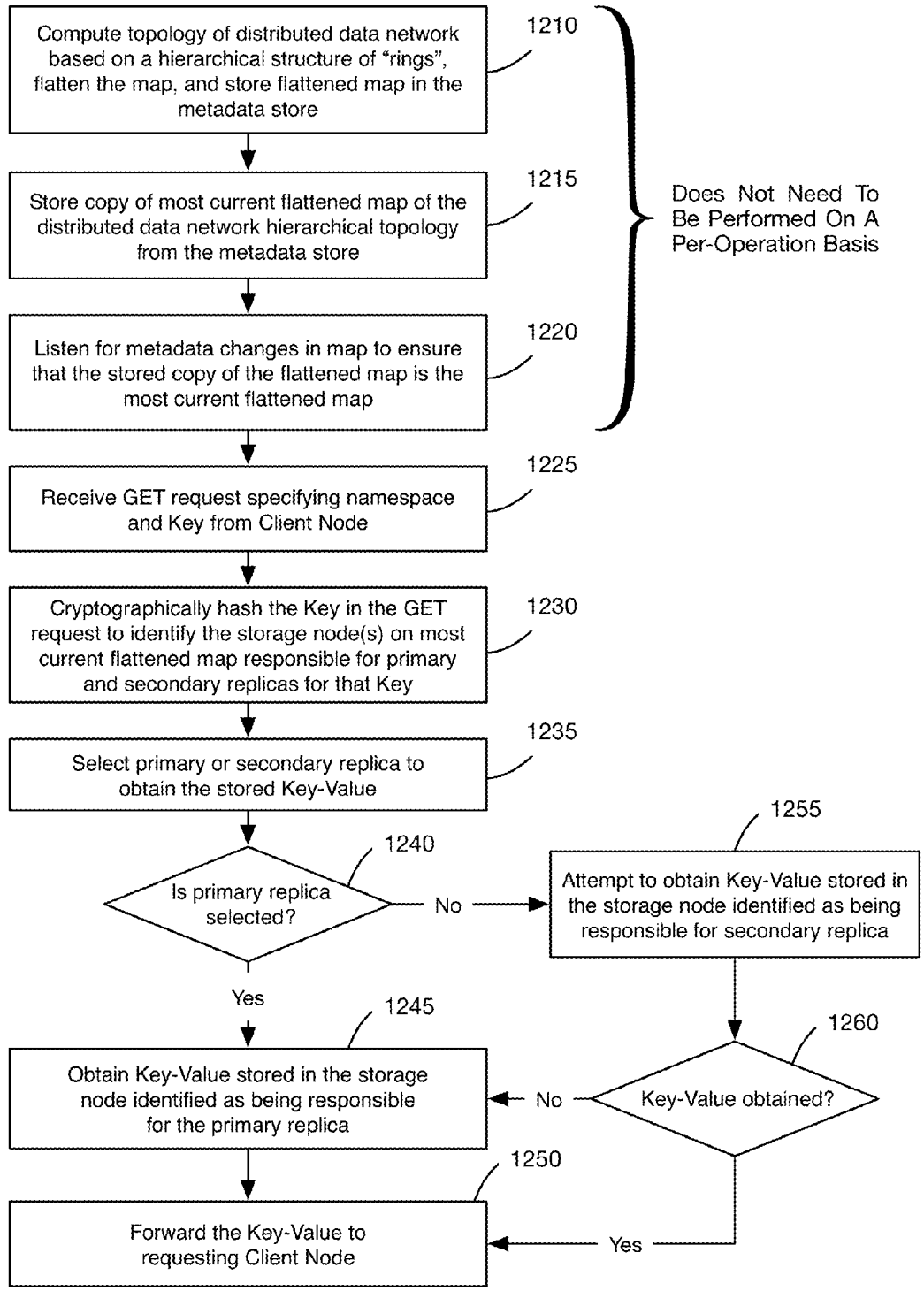
FIG. 12 is a preferred sequence of steps for performing a GET request in the distributed data storage system

FIG. 12 illustrates a preferred sequence of steps for performing a GET request. As described above with respect to the PUT request in FIG. 11, the topology of distributed data network is computed based on a hierarchical structure of "rings," the map is flattened, and the flattened map is stored in the metadata store 320 (Step 1210). The storage daemon running on each node retrieves a copy of most current flattened map from the metadata store 320 and stores the copy in memory on the node (Step 1215). The storage daemon running on each node listens for metadata changes in map to ensure that the stored copy of the flattened map is the most current flattened map (Step 1220). If a new flattened map is generated by the DependencyWatcher module 310, the RingMaster daemon 330 updates the target pointer in the metadata store 320 to point to the latest flattened map, which causes the storage daemon running on each node to transition from the old storage ring to the new ring. This ensures that each storage node stores a copy of the most current flattened map in memory.

Like the PUT request in in FIG. 11, it is understood that Steps 1210 through 1220 in FIG. 12 do not need to be performed on a per-operation basis and are preferably performed prior to receipt of the GET request from a client node.

In operation, a client node transmits a GET request over network 120 to a storage node that acts as a proxy (Step 1225). The GET request specifies the namespace and key. The storage daemon running on the proxy storage node cryptographically hashes the key to identify the storage node(s) on the most current flattened map that are responsible for primary and secondary replicas for that key (Step 1230). The storage daemon causes the proxy storage node to select either a primary or secondary replica to obtain the stored key-value (Step 1235). If a primary replica is selected (Step 1240), the storage daemon obtains the key-value stored in the storage node identified as being responsible for the primary replica (Step 1245) and the storage node knows definitively what value is associated with that key, if any. The key-value obtained from the primary storage replica is transmitted to the requesting client node (Step 1250).

Alternatively, if a secondary replica is selected (Step 1240), the proxy storage node will attempt to obtain the key-value from the storage node identified as being responsible for the secondary replica (Step 1255). If no value is found in the secondary replica (i.e., a "read miss" occurs) (Step 126), then the proxy storage node must obtain the value corresponding to the key from the storage node responsible for the primary replica (Step 1245), which is then forwarded to the requesting client node. In addition, if "Lazy" replication is specified, then the storage daemon causes the proxy storage node to send the value read from the primary replica for storage at specific secondary replicas. If the value is found within the secondary replica (Step 1260), then the proxy storage node forwards the key-value read from the secondary storage replica is transmitted to the requesting client node (Step 1250).

Software process or processes and executables on the computing system may be used to provide human interfaces (such as a graphical user interface), and to store and initiate computer program instructions used to process and analyze data. Computer program code for carrying out operations described herein may be written in any combination of one or more programming languages, including an object oriented programming language such as Java, C++, C# or the like and conventional procedural programming languages, such as the "C" programming language or similar programming languages. The program code may execute entirely on the computing system, partly on the computing system, as a stand-alone software package, partly on the computing system and partly on a remote computer or server, or entirely on a remote computer or server.

This application was described above with reference to flow chart illustrations and/or block diagrams of methods, apparatus (systems) and computer program products according to one or more embodiments. It is understood that some or all of the blocks of the flow chart illustrations and/or block diagrams, and combinations of blocks in the flow chart illustrations and/or block diagrams, can be implemented by computer program instructions. The computer program instructions may also be loaded onto the computing system to cause a series of operational steps to be performed on the computer to produce a computer implemented process such that the instructions that execute on the computer provide processes for implementing the functions/acts specified in the flowchart and/or block diagram block(s). These computer program instructions may be provided to the processor(s) of the computing system such that the instructions, which execute via the processor(s) of the computing system, create means for implementing the functions/acts specified in the flowchart and/or block diagram block(s).

These computer program instructions may also be stored in a computer-readable medium that can direct the computing system to function in a particular manner, such that the instructions stored in the computer-readable medium implement the function/act specified in the flowchart and/or block diagram block or blocks. Any combination of one or more computer usable or computer readable medium(s) may be utilized. The computer-usable or computer-readable medium may be, for example (but not limited to), an electronic, magnetic, optical, electromagnetic, infrared, or semiconductor system, apparatus, device, or propagation medium. More specific examples (a non-exhaustive list) of the computer-readable medium include the following: an electrical connection having one or more wires, a portable computer diskette, a hard disk, a random access memory, a read-only memory, an erasable programmable read-only memory (e.g., EPROM or Flash memory), an optical fiber, a portable compact disc read-only memory, an optical storage device, a transmission media such as those supporting the Internet or an intranet, or a magnetic storage device. Any medium suitable for electronically capturing, compiling, interpreting, or otherwise processing in a suitable manner, if necessary, and storing into computer memory may be used. In the context of this disclosure, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in base band or as part of a carrier wave. The computer usable program code may be transmitted using any appropriate medium, including (but not limited to) wireless, wire line, optical fiber cable, RF, etc.

Having described and illustrated the principles of this application by reference to one or more preferred embodiments, it should be apparent that the preferred embodiment(s) may be modified in arrangement and detail without departing from the principles disclosed herein and that it is intended that the application be construed as including all such modifications and variations insofar as they come within the spirit and scope of the subject matter disclosed.

What is claimed:

1. A topology aware distributed storage system, comprising:
   a plurality of storage nodes for storing key-value data, each storage node including a storage daemon executed by at least one processor;
   at least one client node to provide user access to the storage system;
   a storage manager and metadata store to coordinate retrieval and storage of data in the storage nodes, wherein the storage nodes, at least one client node and storage manager and metadata store are operatively connected to each other over a network;
   wherein the storage manager and metadata store includes program instructions executed by one or more processors to:
      receive at least one user-defined storage policy specifying where data is stored within a topological hierarchy of nodes within the network, the at least one user-defined storage policy specifying the number and location of replicas;
      compute a hierarchical ring topology of the network based on the at least one user-defined storage policy, the hierarchical ring topology including a hierarchical structure of rings representing an organizational structure of nodes within the network,
      flatten the computed hierarchical ring topology into a single global ring, the global ring being divided into segments according to the at least one user-defined storage policy, each segment corresponding to a unique range of integers and associated with a replica set responsible for storing a key corresponding to one of the integers in the unique range of integers for the segment, and
      store the flattened global ring in the metadata store; and
   wherein, for each storage node, the storage daemon causes the at least one processor to:
      retrieve a copy of the flattened global ring from the metadata store,
      store the copy in memory of the storage node,
      perform a hash function on a user key received from the at least one client node, and
      look up the hashed key on the stored copy of the flattened global ring to identify the replica set responsible for storing data corresponding to the hashed key.

2. The system according to claim 1, wherein the program instructions executed by the one or more processors on the storage manager and metadata store cause the one or more processors to:
   compute an updated hierarchical ring topology each time a change occurs within the organizational structure of nodes in the network and flatten the updated hierarchical ring topology into an updated flattened global ring that is stored in the metadata store.

3. The system according to claim 2, wherein, for each storage node, the storage daemon executed by the at least one processor of the storage node causes the at least one processor to:
   monitor for storage of the updated flattened global ring in the metadata store,
   retrieve a copy of the updated flattened global ring in the metadata store, and
   store the retrieved copy in memory of the storage node.

4. The system according to claim 3, wherein, for each storage node, the storage daemon executed by the at least one processor of the storage node causes the at least one processor to:

monitor the operation of the storage daemons running on the other storage nodes, and transmit a vote as to the operational health of the other storage nodes to the storage manager and metadata store.

5. The system according to claim 4, wherein the program instructions executed by the one or more processors on the storage manager and metadata store cause the one or more processors to:

compute and store the updated hierarchical ring topology when the votes received from the storage nodes indicate that a particular node is unhealthy.

6. The system according to claim 5, wherein the program instructions executed by the one or more processors on the storage manager and metadata store cause the one or more processors to:

compute and store the updated hierarchical ring topology when an update is received identifying one or more nodes that have failed.

7. The system according to claim 1, wherein the at least one user-defined storage policy specifies at least one primary replica where data must be stored and at least one secondary replica where data may be stored.

8. The system according to claim 7, wherein a user-defined policy specifies that the at least one secondary replica is populated with data according to at least one of the following modes:

populating the at least one secondary replica at a specific level in the hierarchical ring topology if data is not found on the at least one secondary replica following a read operation;

populating the at least one secondary replica at a specific level in the hierarchical ring topology whenever data is stored in the at least one primary replica; and periodically comparing a summary of keys and versions stored on the at least one primary replica to keys and versions stored on the at least one secondary replica and populating the at least one secondary replica with data corresponding to keys and versions stored on the at least one primary replica and not on the at least one secondary replica.

9. A computer-implemented method for receiving and storing data in a distributed storage system that includes a plurality of storage nodes, at least one client node and a storage manager and metadata store operatively connected to each other over a network, the method comprising:

receiving, using one or more processors of the storage manager and metadata store, at least one user-defined storage policy specifying where data is stored within a topological hierarchy of nodes within the network, the at least one user-defined storage policy specifying the number and location of replicas;

computing, using the one or more processors, a hierarchical ring topology of the network based on the at least one user-defined storage policy, the hierarchical ring topology including a hierarchical structure of rings representing an organizational structure of nodes within the network;

flattening, using the one or more processors, the computed hierarchical ring topology into a single global ring, the global ring being divided into segments according to the at least one user-defined storage policy, each segment corresponding to a unique range of integers and associated with a replica set responsible for storing a key corresponding to one of the integers in the unique range of integers for the segment;

storing the flattened global ring in the metadata store;

for each storage node, retrieving, using at least one processor of the storage node, a copy of the flattened global ring from the metadata store;

for each storage node, storing the retrieved copy of the flattened global ring in memory coupled to the at least one processor of the storage node;

performing, using the at least one processor, a hash function on a user key received from the at least one client node; and looking up, using the at least one processor, the hashed key on the stored copy of the flattened global ring to identify the replica set responsible for storing data corresponding to the hashed key.

10. The method according to claim 9, further comprising:

computing, using one or more processors of the storage manager and metadata store, an updated hierarchical ring topology each time a change occurs within the organizational structure of nodes in the network; and flattening, using the one or more processors, the updated hierarchical ring topology into an updated flattened global ring that is stored in the metadata store.

11. The method according to claim 10, further comprising:

for each storage node, monitoring, using the at least one processor, for storage of the updated flattened global ring in the metadata store;

retrieving by each storage node a copy of the updated flattened global ring in the metadata store; and storing, in memory of each storage node, the retrieved copy of the updated flattened global ring.

12. The method according to claim 11, further comprising:

monitoring, using the at least one processor, the operation of storage daemons running on other storage nodes; and transmitting, using the at least one processor, a vote as to the operational health of the other storage nodes to the storage manager and metadata store.

13. The method according to claim 12, further comprising:

computing and storing, using the one or more processors of the storage manager and metadata store, the updated hierarchical ring topology when votes received from the storage nodes indicate that a particular node is unhealthy.

14. The method according to claim 13, further comprising:

computing and storing, using the one or more processors of the storage manager and metadata store, the updated hierarchical ring topology when an update is received identifying one or more nodes that have failed.

15. The method according to claim 9, wherein the at least one user-defined storage policy specifies at least one primary replica where data must be stored and at least one secondary replica where data may be stored.

16. The method according to claim 15, wherein a user-defined policy specifies that the at least one secondary replica is populated with data according to at least one of the following modes:

populating the at least one secondary replica at a specific level in the hierarchical ring topology if data is not found on the at least one secondary replica following a read operation;

populating the at least one secondary replica at a specific level in the hierarchical ring topology whenever data is stored in the at least one primary replica; and periodically comparing a summary of keys and versions stored on the at least one primary replica to keys and versions stored on the at least one secondary replica and populating the at least one secondary replica with data corresponding to keys and versions stored on the at least one primary replica and not on the at least one secondary replica.

17. The method according to claim 9, further comprising:

receiving, at one of the storage nodes, an action request for storage or retrieval of a key-value from a client node;

cryptographically hashing, using the at least one processor of the storage node, the user key from the received action request;

looking up, using the at least one processor, the hashed key on the stored copy of the flattened global ring to identify the replica set responsible for storing data corresponding to the hashed key.

18. The method according to claim 17, wherein the action request is a PUT request and the method further comprising:

forwarding, using the at least one processor, the key-value for storage within each primary replica in the identified replica set responsible for storing data corresponding to the hashed key.

19. The method according to claim 18, further comprising:

determining, using the at least one processor, whether the user-defined storage policy requires storage of data in one or more secondary replicas in the identified replica set; and if the user-defined storage policy requires storage of data in one or more secondary replicas, forwarding, using the at least one processor, the key-value for storage within the one or more secondary replicas in the identified replica set responsible for storing data corresponding to the hashed key.

20. The method according to claim 17, wherein the action request is a GET request and the method further comprising:

retrieving the key-value, using the at least one processor, stored in a primary or secondary replica in the identified replica set responsible for storing data corresponding to the hashed key; and forwarding the retrieved key-value to the requesting client node.

21. The method according to claim 20, further comprising:

determining, using the at least one processor, whether the key-value is available in a secondary replica in the identified replica set; and if the key-value is not available in the secondary replica, retrieving the key-value, using the at least one processor, stored in a primary replica in the identified replica set responsible for storing data corresponding to the hashed key.

* * * * *